United States Patent [19]

Koester et al.

[11] 4,017,303

[45] Apr. 12, 1977

[54] MANUFACTURE OF ACICULAR FERROMAGNETIC METAL PIGMENTS CONTAINING IRON

[75] Inventors: Eberhard Koester, Frankenthal; Gerd Wunsch, Speyer; Paul Deigner, Weisenheim; Werner Stumpfi, Ludwigshafen; Hans Henning Schneehage, Mutterstadt, all of Germany

[73] Assignee: BASF Aktiengesellschaft, Ludwigshafen, Germany

[22] Filed: July 14, 1975

[21] Appl. No.: 595,563

[30] Foreign Application Priority Data

July 16, 1974 Germany .......................... 2434058

[52] U.S. Cl. .............................. 75/.5 AA; 148/105; 106/290; 106/306; 106/304; 252/62.62
[51] Int. Cl.² .......................................... B22F 9/00
[58] Field of Search ............. 106/308 Q, 306, 304, 106/290; 148/105; 75/.5 AA, .5 BA; 252/62.62, 62.63, 62.64; 427/220

[56] References Cited

UNITED STATES PATENTS

| 3,634,063 | 1/1972 | Hwang | 75/.5 AA |
| 3,661,556 | 5/1972 | Jolley et al. | 148/105 |
| 3,856,580 | 12/1974 | Smeggil et al. | 148/105 |
| 3,856,581 | 12/1974 | Smeggil et al. | 148/105 |
| 3,910,785 | 10/1975 | Greene et al. | 75/.5 BA |

*Primary Examiner*—Patrick P. Garvin
*Assistant Examiner*—John P. Sheehan
*Attorney, Agent, or Firm*—Johnston, Keil, Thompson & Shurtleff

[57] ABSTRACT

A process for the manufacture of acicular ferromagnetic metal pigments containing iron, having a reduced field strength distribution and a steeper residual magnetization curve, by applying an alkaline earth metal cation and an organic compound having at least one group capable of forming a chelate to appropriate acicular iron oxides and then reducing the treated oxides.

9 Claims, No Drawings

MANUFACTURE OF ACICULAR FERROMAGNETIC METAL PIGMENTS CONTAINING IRON

The invention relates to a process for the manufacture of acicular ferromagnetic metal pigments containing iron, having a reduced field strength distribution and a steeper residual magnetization curve.

Because of their high saturation induction and the high coercive force achieved, ferromagnetic metal powders and thin layers of metals are of particular interest for the manufacture of magnetic recording media. This is related to the fact that they permit a substantial increase in the energy product and information density which means, inter alia, that compared to present-day standards, such a recording medium can give narrower signal widths and better signal amplitudes. Thin layers of metal have the further advantage over pigments that the binder constituent normally required can be omitted and the ideal filling factor of 1.0 can be achieved. However, the said metal layers are expensive to manufacture and in particular their use as a recording tape represents problems due to the mechanics of the recorder. Whilst the optimum layer thickness is about 1 $\mu$ or less, the surface of the layer must be very smooth because of the head/type contact, and under these circumstances the minutest amount of abrasion or even dust can be destructive.

It is true that when using metal powders as magnetic pigments, the mechanical properties of the recording medium can be varied within wide limits by appropriate choice of the binder system, but the shape, size and dispersibility of the metal pigments have a conform to special requirements.

Since a high coercive strength and high residual magnetization are essential conditions for magnetic pigments used in layers acting as magnetic stores, the suitable magnetic pigments must display the behavior of a magnetic single domain and furthermore external factors, e.g. temperature or mechanical forces, should have little influence on the existing anisotropy or the anisotropy achievable by magnetic orientation in the tape, i.e. the small particles should be dimensionally anisotropic, preferably acicular, and should in general be of from $10^2$ and $10^4$ A in size.

It has been disclosed that this type of dimensionally anisotropic ferromagnetic metal particles may be produced by metal deposition at a mercury cathode (J. Electrochem. Soc., 10 S (1961), p. 113 S). The precautions which this process requires are considerable and expensive. The reduction of, e.g. iron salts by means of hydrides, (J. Appl. Phys., 32 (1961), p. 184 S) and the vacuum vaporization of the metals and subsequent deposition as whiskers (J. Appl. Phys., 34 (1963), p. 2,905) have also been disclosed but are not of industrial utility. It is also known to manufacture metal powders of the above type by reduction of particulate acicular metal compounds, e.g. oxides, with hydrogen or other gaseous reducing agents. If the reduction is to take place at a rate which is industrially utilizable, it must be carried out at above 350° C. This however entails the difficulty that the resulting metal particles sinter. As a result, the particle shape no longer corresponds to that required from the point of view of the magnetic properties. In order to lower the reduction temperature it has already been proposed to catalyze the reduction by applying silver or silver compounds to the surface of particulate iron oxide (German published Pat. application Ser. No. 2,014,500).

The catalytic acceleration, by noble metals, of the reduction of preferentially acicular starting compounds in general, however, gives far smaller needles than those of the starting product, and furthermore their length: thickness ratio is low. As a result, the end product has a rather broad particle size spectrum and hence a broad distribution of dimensional anisotropy. However, the literature discloses that the dependence of the coercive force and residual magnetization on the particle size of magnetic materials is very marked at the order of magnitude of single-domain particles (Kneller, Ferromagnetismus, Springer-Verlag 1962, p. 437 et seq.). If additional factors enter the picture attributable to a proportion of super-paramagnetic particles which may be produced as fragments when using the above process, then such magnetic pigments are highly unsuitable for use in the manufacture of magnetic recording media, e.g. because of their poor maximum output level. With such heterogenous mixtures, the magnetic field strength required for magnetic reversal of the particles varies greatly and the distribution of the residual magnetization as a function of the applied external field also gives a curve of low slope.

It is an object of the present invention to provide a process for the manufacture of acicular ferromagnetic metal pigments containing iron, such that the metal pigments obtained by reduction exhibit a narrow field strength distribution and a steep residual magnetization curve.

We have found that magnetic pigments which are acicular and ferromagnetic and predominantly contain iron can be manufactured by reduction of the acicular oxides with hydrogen at up to 400° C, so as to retain the acicular shape, by a process wherein, prior to the reduction, there are applied to the acicular oxides an alkaline earth metal cation and an organic compound which contains at least one group which can form chelates and which has the general formula I

 (I)

where X and Y are

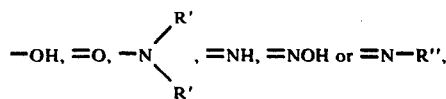

R' is a terminal short-chain carboxylic acid bonded to the nitrogen, R" is alkyl or aryl and R is substituted or unsubstituted two-membered or three-membered carbon chain or a corresponding part of an aromatic ring.

The compounds of the formula I which, according to the invention, are applied, simultaneously with the alkaline earth metal cation, to the iron oxide, contain, per molecule, two functional groups linked by a two-membered or three-membered carbon chain which frequently consists, in part, of substituted or unsubstituted methylene groups. However, the carbon chain may also be a part of an aromatic ring. As a result of the groups which can form chelates, a cyclic structure with 5 to 6 ring members, depending on the length of the carbon chain linking the functional groups, is formed with the cation.

The following are examples of groups of compounds which may be used according to the invention.

1. Compounds of the formula

in which X and Y are oxygen, e.g.

a. β-diketones which at least one methylene hydrogen between the carbonyl groups of the general formula

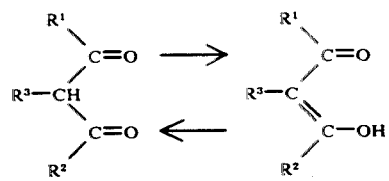

where R¹ and R² are alkyl of 1 to 24 carbon atoms or aryl and R³ is H or is defined like R¹, e.g. acetylacetone, methylacetylacetone, ethylacetylacetone, propylacetylacetone, phenylacetylacetone, propionylacetone, dipropionylmethane, benzoylacetone, dibenzoylmethane, methylbenzoylacetone, methyldibenzoylmethane and the like;

b. β-keto-carboxylic acid esters with at least one methylene hydrogen between the keto and carboxyl group, of the general formula

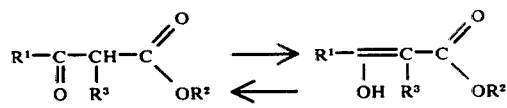

where R¹, R² and R³ have the same meanings as under (a), e.g. acetoacetic acid methyl ester, ethyl ester, propyl ester, isopropyl ester, butyl ester, isobutyl ester, t-butyl ester, amyl ester, hexyl ester, nonyl ester, decyl ester and the like;

c. aromatic o-hydroxyketones, e.g. o-hydroxyacetophenone, or o-hydroxyaldehydes, e.g. salicylaldehyde.

2. Compounds of the formula

in which X is oxygen and Y is nitrogen e.g.

a. Schiff's bases of carbonyl compounds mentioned under (1) with amines, e.g. acetylaceoanil, bis-acetylacetone-ethylenediamine, bis-silicylaldehyde-ethylenediamine, bis-salicylaldehyde-o-phenylenediamine, bis-salicylaldehyde-propylenediamine and bis-acetylacetone-o-phenylenediamine.

b. Aminoacetic acids or aminopropionic acids containing the general group

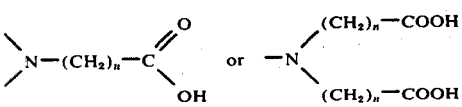

where n is 1 or 2, e.g. ethylenediaminetetracetic acid, ethylenediaminetetrapropionic acid, nitrilotriacetic acid, iminodiacetic acid, iminodipropionic acid, melaminehexaacetic acid, melaminehexapropionic acid or their alkali metal salts. 3. Compounds of the formula

in which X and Y are nitrogen, e.g. compounds containing the general group

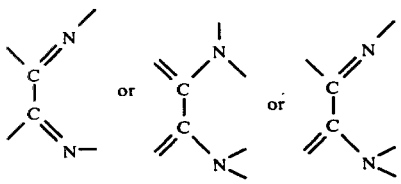

e.g. dimethylglyoxime, diaminoglyoxime, benzildioxime, bis-imidazolinyl, bis-tetrahydropyrimidinyl, α, α-dipyridyl, ethylenediamine, diethylenetriamine, triethylenetetramine and the like.

Amongst the abovementioned organic compounds, the β-diketones and β-ketocarboxylic acid esters mentioned under (1) and the aminocarboxylic acids mentioned under (2 b) are particularly suitable.

Iron oxides which may be used according to the invention are the acicular iron oxides from amongst α-FeOOH, $Fe_3O_4$, $Fe_2O_3$ and γ-$Fe_2O_3$, and the same iron oxides modified with cobalt and/or nickel. These oxides may also be used for the manufacture of ferromagnetic metal pigments if they contain other elements, provided that the incorporation of other foreign elements does not disturb the acicular form. Particularly preferred ferromagnetic metal pigments contain iron and up to 25 atom percent of cobalt.

The alkaline earth metal cation applied simultaneously with the organic compound to the iron oxide is chosen from amongst calcium, barium and strontium.

The acicular oxide particles are preferably treated by dispersing them, together with a soluble alkaline earth metal compound and the organic compound, in a solvent which is suitable for the compounds to be applied to the iron oxide and which is easily removed subsequently. Water or alcohols may be used with advantage. In another embodiment of the process of the invention, a complex salt is first formed, separately, from the organic compound and the alkaline earth metal salt and is then applied in solution to the oxide, after which the solvent is evaporated off.

According to the process of the invention, the acicular oxide treated in this way is reduced to the metal by conventional methods, by passing a gaseous reducing agent, preferably hydrogen, at up to 400° C, preferably at from 230° to 350° C, over the oxide material. According to the state of the art, satisfactory rates of reduction and satisfactory degrees of reduction were not achievable with untreated metal oxides at reduction temperatures below 400° C, if sintering of the resulting metal particles was to be avoided. It is true that surface modification with noble metals gave a higher rate of reaction and a higher coercive force, but the other magnetic values and pigment properties did not conform to the high standards which magnetic pigments for magnetic recording media must meet.

The magnetic values of the powders were measured with a vibrating sample mgnetometer at a magnetic field of 800 kA/m.

In addition to a high coercive force Hc and a high residual induction, the so-called remanence coercivity $H_R$ is an important parameter in assessing the powder. In d.c. demagnetization, half - based on volume - of the particles have had their magnetization reversed at field strength $H_R$. According, $H_R$ is a characteristic parameter for recording processes which, in particular, determines the bias setting for magnetic recording. The more heterogeneous is the remanence coercivity of the individual magnetic particles in the recording layer, the broader is the distribution of the magnetic fields which can reverse the magnetization of a defined colume of the recording layer. This plays a role particularly if, because of high recording densities or low wavelengths, the boundary zone between magnetic domains of opposite magnetization should be as narrow as possible. To characterize the distribution of the reversal field strengths of the individual particles, a value $h_5$ for the total width of the residual induction curve and $h_{25}$ for the slope of the residual induction curve is determined from the d.c. field demagnetization curve. These values are determined from the equations $$h_5 = (H_{95} - H_5/H_R)$$

and $$h_{25} = (H_{75} - H_{25}/H_R).$$

The subscript of the letter H indicates what percentage of the particles have had their magnetization reversed.

Typical values of $h_5/h_{25}$ are 1.5/0.6 for gamma-iron (III) oxide powders and chromium dioxide powders and 1.0/0.3 for the magnetic tapes obtained with these powders. Magnetic metal pigments of the art, and magnetic tapes produced therewith, exhibit higher values, of about from 1.8 to 2.0/0.6 in the case of the powder, which thus indicate a broader distribution of the field strengths. As expected, magnetic thin layers of metals exhibit a particularly narrow distribution, with values of about 0.5/0.1.

On treating the acicular iron oxides in accordance with the invention with from 0.2 to 10 percent by weight, preferably from 2 to 8 percent by weight, based on the iron oxide employed, of the alkaline earth metal cation and of the organic compound of the formula I, the metal pigments obtained after reduction exhibit particularly low $h_5/h_{25}$ values.

After reduction, which is practically complete even at temperatures below 300° C, it is found that there has only been an insignificant change in the acicular form of the initial oxides. Examples of products of the process of the invention are iron needles of from 0.1 to 0.6 $\mu$ in length, with a length : thickness ratio of from 10 to 25 : 1.

The $h_5/h_{25}$ values of metal pigments manufactured according to the invention are from 1.6/0.5 to 1.35/0.45. Such magnetic metal powders, in spite of having been manufactured by reduction of oxide powders, give acicular particles of consistently well-developed structure, which in addition to the advantageous magnetic properties of dimensionally anisotropic ferromagnetic small particles exhibit the narrow field strength distribution required for use of the particles in magnetic recording media for high recording densities and frequencies.

The process of the invention has proved to be particularly advantageous in the case of iron oxides modified with cobalt or nickel. It is known that it is particularly these acicular oxides which lose their external form on reduction to the metal. This disadvantage no longer manifests itself when the process of the invention is used. Because of the particularly favorable magnetization values of iron-cobalt particles, this is a further advantage of the present invention.

The experiments which follow illustrate the process of the invention and show, by comparative experiments, the technical innovation achieved. For easier appreciation, the acicular shape and magnetic values are tabulated. The metal particles obtained after reduction were pyrophoric and had to be passivated by conventional processes before they were used further.

EXAMPLE 1

100 g of $\alpha$-FeOOH needles of length 0.5 $\mu$ and 30 : 1 length: thickness ratio are dispersed in 2,000 ccs of methanol in which 3.7 g of barium acetylacetonate have been dissolved. After evaporating off the methanol, the powder is dried at 100° C. After reduction with 200 l of hydrogen per hour at 275° C for 8 hours an acicular iron powder is obtained.

EXAMPLE 2

The procedure followed is as in Example 1 except that 7.5 g of barium acetylacetonate are dissolved in the methanol and the reduction is carried out at 300° C.

EXAMPLE 3

100 g of $\alpha$-FeOOH of Example 1 are dispersed in a solution of 3.2 g of strontium acetylacetonate in 2,000 ccs of methanol, and after evaporating off the liquid, the material is reduced to the metal with hydrogen for 8 hours at 175° C.

EXAMPLE 4

100 g of $\alpha$-FeOOH of Example 1 are dispersed in a solution of 2.7 g of calcium acetylacetonate in 2,000 ccs of methanol, and after evaporating off the liquid, the material is reduced to the metal with hydrogen for 8 hours at 175° C.

EXAMPLE 5

100 g of $\alpha$-FeOOH of Example 1 are dispersed in 1.5 l of water in which 6 g of cobalt chloride hexahydrate have been dissolved. Cobalt hydroxide is precipitated on the surface of the $\alpha$-FeOOH by adding dilute ammonia solution until the pH is 10, and the pigment is then dried. 100 g of the resulting $\alpha$-FeOOH containing 1.5% of Co are dispersed in a solution of 3.8 g of barium acetylacetonate in 1.5 l of methanol and, after evaporating off the liquid, the material is reduced to the metal with hydrogen for 8 hours at 325° C.

EXAMPLE 6

100 g of α-FeOOH of Example 1 are dispersed in 1.5 l of methanol to which 3.6 g of barium hydroxide octahydrate dissolved in 50 ccs of water are added, and 3 g of ethyl acetoacetate are added to the dispersion. After evaporating off the liquid, the material is reduced to the metal with hydrogen for 8 hours at 275° C.

EXAMPLE 7

100 g of α-FeOOH of Example 1 are dispersed in 1.5 l of methanol to which 3.6 g of barium hydroxide octahydrate dissolved in 50 ccs of water are added, and a solution of 4.2 g of sodium ethylenediaminetetraacetate in 250 ccs of water is added to the dispersion. After evaporating off the liquid, the materials is reduced to the metal with hydrogen for 8 hours at 300° C.

EXAMPLE 8

100 g of α-FeOOH of Example 1 are dispersed in 1.5 l of ethanol to which 3.6 g of barium hydroxide octahydrate dissolved in 50 ccs of water are added, and a solution of 1.4 g of ethylenediamine in 50 ccs of ethanol is added to the dispersion. After evaporating off the liquid, the material is reduced to the metal with hydrogen for 8 hours at 275° C.

EXAMPLE 9

100 g of α-FeOOH of Example 1 are dispersed in 1.5 l of ethanol to which 3.6 g of barium hydroxide octahydrate dissolved in 50 ccs of water are added, and a solution of 2 g of triethylenetetramine in 50 ccs of ethanol is added to the dispersion. After evaporating off the liquid, the material is reduced to the metal with hydrogen for 8 hours at 300° C.

COMPARATIVE EXPERIMENT 1

100 g of α-FeOOH of Example 1 are dispersed in 2,000 ccs of methanol. After evaporating off the methanol, the dried powder is reduced for 8 hours at 275° C with 200 l of hydrogen for hour.

COMPARATIVE EXPERIMENT 2

100 g of α-FeOOH of Example 1 are dispersed in 2,000 ccs of ethanol in which 0.38 g of silver nitrate are dissolved. After evaporating off the alcohol, the powder is dried. The reduction is carried out at 250° C with 200 l of hydrogen per hour and is complete after 8 hours.

COMPARATIVE EXPERIMENT 3

The procedure followed is as in Comparative Experiment 2 except that 0.40 g of palladium acetylacetonate are dissolved in the ethanol.

TABLE

| Experiment No. | Reduction temperature ° C | Needle length,/μ | Length: thickness ratio | Magnetic values at 800 kA/m $H_c$ [kA/m] | $H_R$ [kA/m] | $h_s/h_{25}$ |
|---|---|---|---|---|---|---|
| Example 1 | 275 | 0.2 to 0.4 | 15 to 25 : 1 | 105 | 132 | 1.45/0.49 |
| Example 2 | 300 | 0.2 to 0.4 | 15 to 25 : 1 | 107 | 132 | 1.35/0.47 |
| Example 3 | 275 | 0.2 to 0.3 | 15 to 20 : 1 | 104 | 128 | 1.48/0.50 |
| Example 4 | 275 | 0.2 to 0.3 | 15 to 20 : 1 | 105 | 131 | 1.42/0.48 |
| Example 5 | 325 | 0.2 to 0.3 | 15 : 1 | 110 | 135 | 1.40/0.47 |
| Example 6 | 275 | 0.2 to 0.4 | 15 to 25 : 1 | 105 | 127 | 1.45/0.48 |
| Example 7 | 300 | 0.2 to 0.3 | 15 : 1 | 98 | 119 | 1.56/0.52 |
| Example 8 | 275 | 0.2 to 0.3 | 15 to 20 : 1 | 99 | 121 | 1.53/0.50 |
| Example 9 | 300 | 0.2 to 0.4 | 15 to 25 : 1 | 104 | 125 | 1.49/0.52 |
| Comparative experiment 1 | 275 | 0.1 to 0.2 | 5 to 8 : 1 | 90 | 122 | 1.85/0.62 |
| Comparative experiment 2 | 250 | 0.07 to 0.15 | 5 to 8 : 1 | 98 | 121 | 1.65/0.55 |
| Comparative experiment 3 | 250 | 0.05 to 0.13 | 5 to 8 : 1 | 97 | 119 | 1.65/0.55 |

We claim:
1. A process for the manufacture of acicular ferromagnetic metal pigments, predominantly containing iron, comprising the steps of:
    a. dispersing acicular iron oxide in a solution of (i) an alkaline earth metal compound wherein the alkaline earth metal cation of said alkaline earth metal compound is selected from the group consisting of Ca, Ba, and Sr cation, and (ii) an organic compound which contains at least one group which can form chelates of the formula I

in which X and Y are

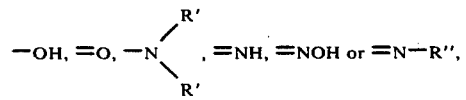

wherein R' is a terminal short-chain carboxylic acid linked to nitrogen by means of an amino bond, R" is alkyl or aryl and R is a two-membered or three-membered carbon chain or a part of an aromatic ring, whereby said organic compound forms a chelate with said alkaline earth metal cation in the solvent used to form said solution,
    b. removing the solvent by evaporation wherein said chelate is applied to said acicular iron oxide, and
    c. reducing the so-treated acicular iron oxide with hydrogen at temperatures of up to 400° C to form metal pigments which retain their acicular shape.

2. A process as set forth in claim 1, wherein the iron oxide is an acicular iron oxide containing cobalt or nickel.

3. A process as set forth in claim 1, wherein the acicular iron oxide is α-FeOOH.

4. A process as set forth in claim 1, wherein the alkaline earth metal cation is barium.

5. A process as set forth in claim 1, wherein the organic compound of the formula I is an acetylacetonate.

6. A process as set forth in claim 1, wherein the organic compound of the formula I is ethyl acetoacetate.

7. A process as set forth in claim 1 wherein the treated acicular iron oxide is reduced with hydrogen at a temperature of about 230° to 350° C.

8. A process as set forth in claim 1 wherein the acicular iron oxide contains up to about 25 atom percent of cobalt.

9. A process as set forth in claim 1 wherein said solvent is water or alcohol.

* * * * *